US012595317B2

(12) United States Patent
Wood et al.

(10) Patent No.: US 12,595,317 B2
(45) Date of Patent: Apr. 7, 2026

(54) LIQUID AND AGAR FLUOROPHORE PHANTOM

(71) Applicant: SYNAPTIVE MEDICAL INC., Toronto (CA)

(72) Inventors: Michael Frank Gunter Wood, Toronto (CA); Eva Romy Dow Chapman, Toronto (CA)

(73) Assignee: Synaptive Medical Inc.

( * ) Notice: Subject to any disclaimer, the term of this patent is extended or adjusted under 35 U.S.C. 154(b) by 715 days.

(21) Appl. No.: 17/940,080

(22) Filed: Sep. 8, 2022

(65) Prior Publication Data

US 2023/0071061 A1 Mar. 9, 2023

Related U.S. Application Data

(60) Provisional application No. 63/261,022, filed on Sep. 9, 2021.

(51) Int. Cl.
*C08B 37/00* (2006.01)
*G09B 23/30* (2006.01)

(52) U.S. Cl.
CPC .......... *C08B 37/0039* (2013.01); *G09B 23/30* (2013.01)

(58) Field of Classification Search
CPC ............................ C08B 37/0039; G09B 23/30
USPC .............................................................. 536/3
See application file for complete search history.

(56) References Cited

U.S. PATENT DOCUMENTS 9,301,686 B2 4/2016 Montcuquet

FOREIGN PATENT DOCUMENTS

WO WO2020148720 7/2020

OTHER PUBLICATIONS

Zhang et al. Angle-Resolved Spectroscopy: a Tissue-Mimicking Phantom Study. Proc. of SPIE vol. 8221, 82211B , p. 1-8, 2012. doi: 10.1117/12.909785 (Year: 2012).*

Deliolanis et al. In vivo tomographic imaging of red-shifted fluorescent proteins. Biomedical Optics Express vol. 2, No. 4, p. 887-900, Apr. 1, 2011. (Year: 2011).*

Pooya Movahed, Wayne Kreider, Adam D. Maxwell, Barbrina Dunmire, and Jonathan B. Freund. Ultrasound-induced bubble clusters in tissue-mimicking agar phantoms. Ultrasound in Med. & Biol., vol. 43, No. 10, pp. 2318-2328, 2017 c2017 World Federation for Ultrasound in Medicine & Biology.

Li Xipan, Jia Ge, Shuanyang Zhang , Jian Wu , Li Qi , Wufan Chen. Multispectral interlaced sparse sampling photoacoustic tomography based on directional total variation. Computer Methods and Programs in Biomedicine vol. 214, Feb. 2022, 106562.

Garcia et al,. Development of a system to treat and online monitor photodynamic therapy of skin cancer using PplX near-infrared fluorescence Photodiagnosis and Photodynamic Therapy vol. 30, Jun. 2020, 101680.

Search Report issued by the Intellectual Property Office of Great Britain in relation to the corresponding GB2213150.2 dated Mar. 9, 2023, 5 pgs.

* cited by examiner

*Primary Examiner* — Yih-Horng Shiao

(57) ABSTRACT

A phantom is disclosed containing fluorescence properties similar to anatomy that is needed to be visualized during surgical procedures. The phantom is created using substances including fluorophores that respond to UV light excitation to give visual cues of the phantom. The phantom can vary in phase and fluorescent properties depending on what it needs to simulate in the medical field with the purpose to help train users for surgical and diagnostic procedures, and develop, enhance, and calibrate imaging technology.

13 Claims, 13 Drawing Sheets

020

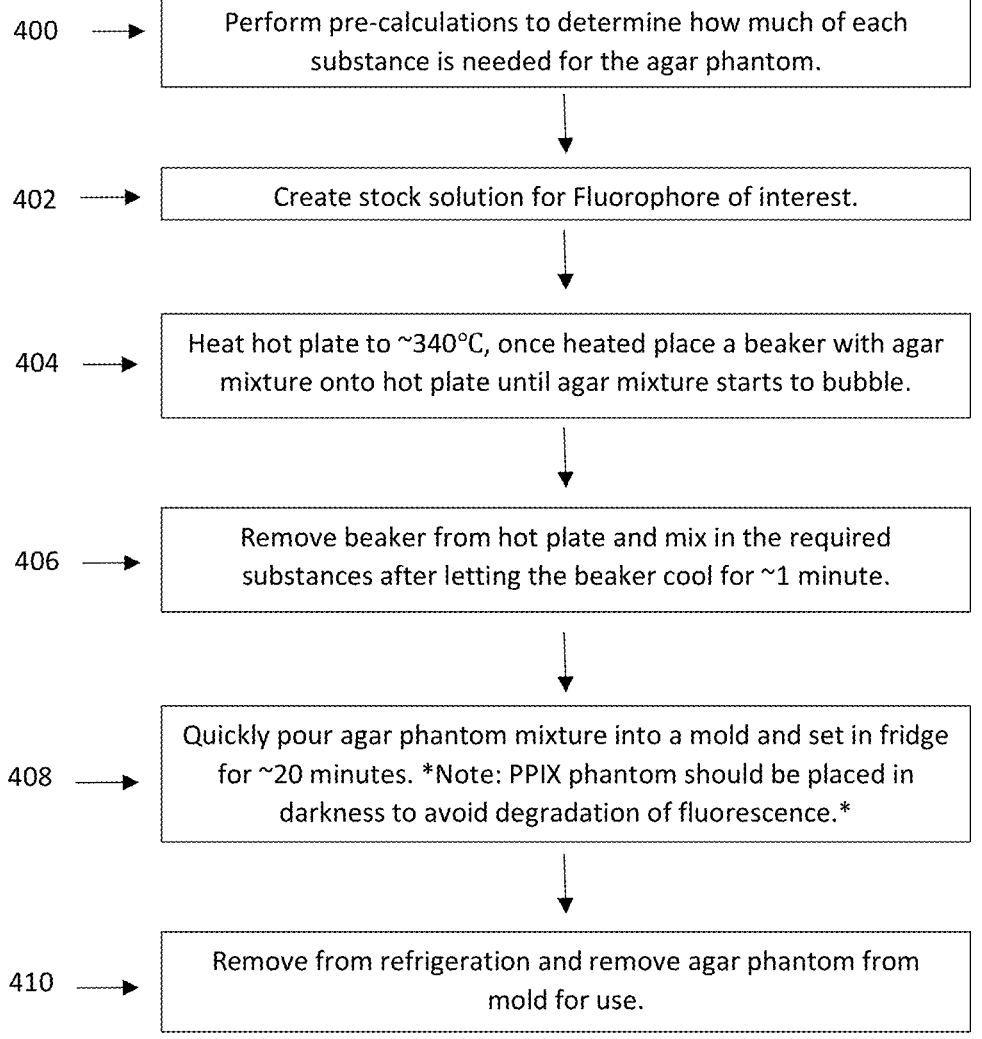

400   →    Perform pre-calculations to determine how much of each substance is needed for the agar phantom.

402   →    Create stock solution for Fluorophore of interest.

404   →    Heat hot plate to ~340°C, once heated place a beaker with agar mixture onto hot plate until agar mixture starts to bubble.

406   →    Remove beaker from hot plate and mix in the required substances after letting the beaker cool for ~1 minute.

408   →    Quickly pour agar phantom mixture into a mold and set in fridge for ~20 minutes. *Note: PPIX phantom should be placed in darkness to avoid degradation of fluorescence.*

410   →    Remove from refrigeration and remove agar phantom from mold for use.

FIG. 4

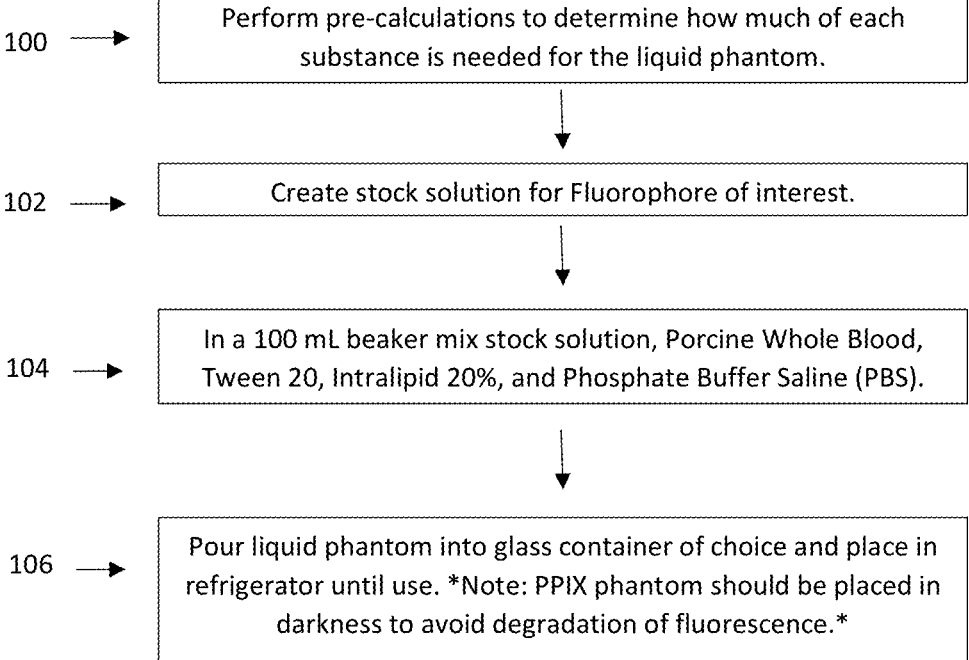

100 → Perform pre-calculations to determine how much of each substance is needed for the liquid phantom.

102 → Create stock solution for Fluorophore of interest.

104 → In a 100 mL beaker mix stock solution, Porcine Whole Blood, Tween 20, Intralipid 20%, and Phosphate Buffer Saline (PBS).

106 → Pour liquid phantom into glass container of choice and place in refrigerator until use. *Note: PPIX phantom should be placed in darkness to avoid degradation of fluorescence.*

FIG. 10

LIQUID AND AGAR FLUOROPHORE PHANTOM

CROSS REFERENCE TO RELATED APPLICATIONS

The application claims priority to and the benefit of U.S. Utility Provisional Application Ser. No. 63/261,022, entitled "LIQUID AND AGAR FLUOROPHORE PHANTOM", filed on Sep. 9, 2021 which is incorporated herein by reference in its entirety.

FIELD

The present disclosure relates to fluorescence imaging of anatomy during medical procedures. Specifically, it relates to phantoms which have fluorescent properties modelling a clinical application of fluorophores during medical procedures.

BACKGROUND

The medical applications of fluorophores are widespread. Examples include, but not limited to, staining and highlighting specific cells, tissues, and vessels to aid in surgeries, lab testing, and imaging. They are important for detecting certain areas of interest not just in the medical field, but for many other scientific fields. Fluorophores are significant as they can absorb one wavelength of light and emit another to give a certain characterization, bright colours, to substances within microbiology to larger anatomical features.

As previously mentioned, fluorophores are used in a range of fields, one being surgery. Fluorophores help guide surgeons and medical practitioners specifically to visualize and distinguish a desired tissue or vessel and its margins. Three main fluorophores that are used within this clinical application are Indocyanine Green (ICG), Sodium Fluorescein, and 5-Aminolevunlinic Acid (5-ALA) which causes accumulation of Protoporphyrin IX (PPIX) within tumors. These fluorophores absorb and are excited by near-infrared (780 nanometers (nm)), blue (450 nm), and blue-violet (405 nm) light respectively and emit wavelengths 800 nm, 500 nm, and 450 nm respectively that can be observed by a human. 5-ALA is a fluorophore that is most commonly ingested orally by a patient before surgery, which then reacts with tumor cells and causes PPIX to accumulate. Sodium Fluorescein is injected intravenously and accumulates in the area that the tumor has disrupted. For example, gliomas, a tumor within the brain, disrupt the blood brain barrier (BBB). Therefore, Sodium Fluorescein flows through the BBB to the area where the glioma resides. Lastly, ICG is injected intravenously as well and flows through vessels to highlight any obstructions through vasculature.

During surgical procedures, the administration and concentration of the fluorophores are important. Fluorophores have an optimal concentration for visualization, unfortunately, the fluorescent properties degrade over time. For Sodium Fluorescein, PPIX, and ICG, the concentrations that are relevant and used in the present disclosure are shown to be 30 µM, 5 µM, and 6.5 µM for the fluorophores respectively.

When cells divide at an abnormal rate, tissue can accumulate and become larger growths. These are called tumors, which can cause damage to surrounding tissue leading to further problems regarding vasculature, nerves, and specifically the blood brain barrier within neuroanatomy. During surgery, it is crucial for surgeons to be able to see and distinguish between healthy tissue and tumor tissue so as to not cause further damage and to be able to remove any unhealthy tissue. To visualize the unhealthy tissue during surgery, the fluorophores previously mentioned are used. In surgeries where guided-fluorescent imaging is used, a light source that has the ability to emit the specific wavelength that excites the fluorophores is required. In addition, there are surgical microscopes that can enhance the visualization effects of the fluorophores for better guidance via fluorescent filters or settings during surgical procedures.

In order to represent and test the quality and visibility of the fluorophores, phantoms made from various materials are created to model how fluorophores act within the human body and mimic specific tissue. Phantoms allow scientists to test properties of tissue in a safe environment, preventing trials that may cause harm to individuals. Phantoms can be fluid or solid and can be placed within real human anatomy or other phantoms to simulate a patient's condition. As guided-fluorescent surgical procedures have risks associated with them, phantoms are a great tool to simulate what the anatomy will look like prior to an actual procedure.

To mimic tissue with phantoms, certain materials and methods are required that may not be easily accessible and may not be able to be altered depending on what the phantom is modelling. The more accessible materials and methods may result in phantoms that do not closely mimic anatomical features. Phantoms for fluorophores are created in fluid form (combination of solutions and the fluorescing agent) and some are made into solids. Unfortunately, with more accessible materials, creating a solid phantom can have the risk of fluorescing on its own, which could disrupt the efficacy of the desired fluorophore that is contained within the phantom.

Currently, many phantoms are specific in what they represent, they are limited in size, shape, phase, and fluorescence which limits the usability for testing and calibrating technology as well as decreases the ability to meet users' needs in terms of what they need to visualize.

SUMMARY

The present disclosure describes a phantom that closely mimics anatomy that fluoresces. This is done by using fluorophores used in clinical applications and simulates what the visualization of the anatomical feature would look like in a surgical procedure.

In one aspect, the present disclosure describes a phantom made from mainly agar powder and a fluorophore of choice. This agar phantom resembles an anatomical abnormality that contains the fluorophores used during surgical procedures and simulates to surgical staff what the visualization of the anatomical abnormality will be.

In another aspect, the present disclosure describes a method of creating the anatomy of interest. This may consist of pouring the phantom mixture into a mold of the anatomical feature, placing it in the fridge, and then removing from the mold once solidified. The present disclosure describes a phantom that can embody an anatomical feature or pathological abnormality with or without fluorescent properties depending on what it needs to simulate.

The present disclosure also covers the liquid phantom that can contain fluorophore to simulate fluorescing fluid within medical procedures, specifically within vasculature.

The phantoms serve the purpose to develop, calibrate, and test old and new imaging technology and systems, as well as training users, for example, surgeons on how to use the imaging technology and visualize what the anatomy will look like.

A further understanding of the aspects of the present disclosure can be found in the following detailed description and drawings.

BRIEF DESCRIPTION OF DRAWINGS

Different embodiments of the present disclosure will be discussed in the following Detailed Description as presented in conjunction with the following Drawing Figures.

FIG. 4 is a flowchart that illustrates the procedure for creating the fluorescent tumor agar phantom.

FIG. 10 is a flowchart that illustrates the procedure for the fluorescent liquid phantom.

DETAILED DESCRIPTION

Various components of the present disclosure will be described in detail below.

The following description and drawings are illustrative of the disclosure and are not to be construed as limiting the disclosure.

Fluorescence and image guided surgery allow surgeons to be able to identify cancerous growths during procedures that may be hard to visualize otherwise. There are high risk surgeries, where determining what is healthy and unhealthy tissue is crucial for resecting tumors. For surgeons to have the best outcomes in removing unhealthy tissue and minimizing any damage that happens during the procedures, fluorophores are the main factor in detecting microscopic tumors that would be easily missed due to size and other inhibiting factors to visualization.

The present disclosure pertains to resembling the anatomy that fluoresces during procedures through phantoms that are made with similar properties and fluorescence. It should be noted that although the present disclosure describes the phantom in relation to the brain and human body, it is not limited and can also be applicable to other anatomical models that may benefit from a fluorescing phantom.

Figure 1:
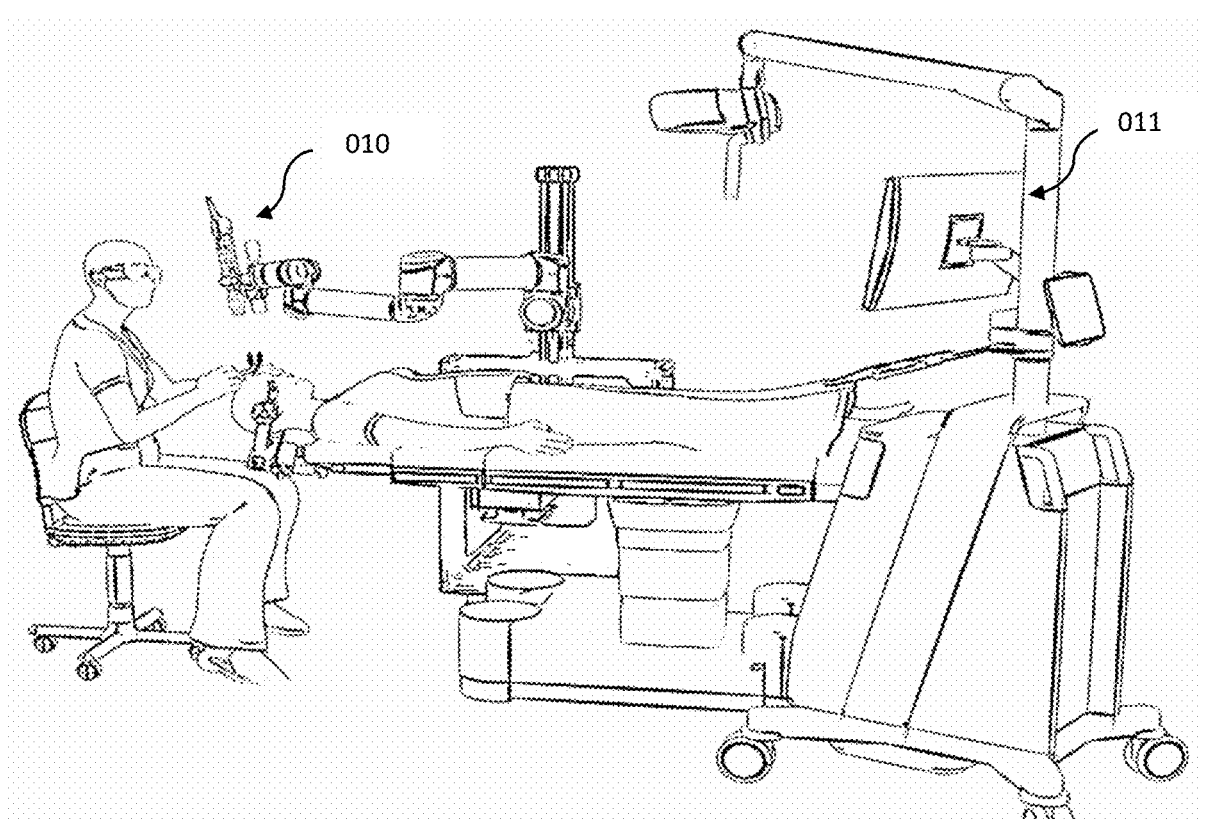
FIG. 1 is an illustration of an example of a surgical procedure setup including but not limited to the patient, monitors, surgeon, microscope and other surgical tools.

When performing surgical and/or diagnostic procedures, for example neurosurgery, image guided technology helps users perform with better efficiency and less invasive procedures. The set-up of the system is represented in FIG. 1, where a surgeon, for example, is performing a craniotomy on a patient. The user views their performance on a monitor 011 and an exoscope is used to capture the procedure 010. For example, in FIG. 2 a craniotomy is illustrated where the imaging technology 020 specifically a microscope with fluorescent visualization capabilities is used to image the brain and any abnormality that may be relevant to the procedure.

Figure 3:
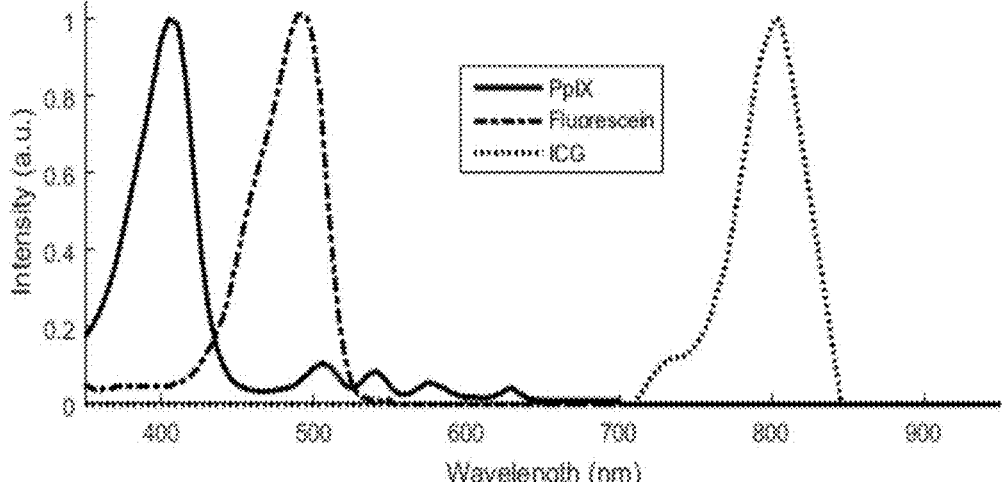
FIG. 3 is a graph that represents the light intensity and excitation wavelength of PPIX, Sodium Fluorescein, and ICG.

The fluorophores that are used in procedures are mainly ICG, Sodium Fluorescein, and 5-ALA which result in PPIX. In FIG. 3, the emission wavelength of each fluorophore is shown. The excitation and emission of fluorophores are important when using image guided surgery. For fluorescent guided surgery specifically, the emission wavelength is what the user will see and the imaging technology should allow users to optimally visualize these fluorophores within anatomy.

To test the optical efficacy of new imaging technology in surgical procedures, phantoms can be made to simulate what the fluorescent agents will look like in anatomy. This aids in developing and testing new imaging technology, as well as calibrating existing technology within a low-risk environment. Lastly, the phantom can be used for training users of the fluorescence imaging technology by providing a realistic model of the anatomy of interest.

Figure 2:
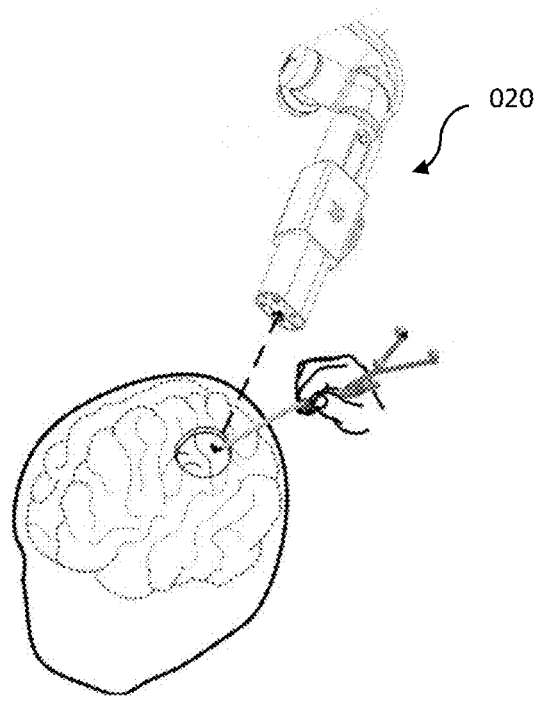
FIG. 2 is an illustration of an example of a surgical microscope that is viewing a craniotomy within neurosurgery. The illustration includes a surgical pointer that directs the microscope to the desired area for visualization.

An example of using the methods and technology represented in FIGS. 1-3 in the neurosurgical field would be the use of fluorescence, such as 5-ALA. It acts as an agent for the detection of glioma tumors, and potentially other cancerous pathogens, as well as a visualization aid in image-guided oncologic surgery. In many instances, the delineation between healthy tissue and pathogen is not obvious. A glioma is a fast-developing tumor of the glial tissue of the nervous system that is often indistinguishable from healthy brain tissue. Typically, a complete resection of the glioma is required to extend life. 5-ALA is used clinically for tumor detection (fluorescence imaging) and treatment (tumor resection). 5-ALA is selectively taken up by the glioma, and metabolized into PPIX, which, when exposed to light in the ultraviolet-visible spectral region, fluoresces, thereby aiding in the detectability of the tumor. The use of 5-ALA to aid in identifying tumor margins may lead to extended survival timelines for patients by assisting in the detection of, and resection of, a higher tumor volume.

Image-guided surgical procedures are complex procedures. When higher risk procedures are involved, such as procedures in the brain, the surgical staff often resort to performing a simulated rehearsal of the procedure ahead of time to minimize risk. Understanding and modelling tissue deformations to interventional medical instruments are important for surgeons practicing invasive medical procedures on patients. Being able to accurately model various types of tissues may improve a surgeon's ability to approach and target regions of interest in the patient's body with minimal damage and maximum effectiveness with the use of fluorescence.

In order to mimic the anatomy and fluorescence that is present in surgical procedures and training, there are different embodiments of the phantom described in the present disclosure that are able to model these desired visual properties. The phantom can be liquid or solid, it can also contain a fluorophore of choice, not limited to the ones mentioned in the description. It can embody, not exclusively, general anatomy, a fluid within the human body, cancerous tissue, and anatomy abnormalities. As well it can embody a fluorescing or non-fluorescing feature.

The agar phantom is an opaque solid phantom that is designed to resemble a tumor, but may be used to model other anatomical features given its tissue-like characteristics and its ability to contain fluorophores. The procedure on how the agar phantom is created is shown in FIG. 4. The phantom has a consistency similar to gelatin, and can be poured, molded, and cooled into any container of choice. Once cooled, the phantom holds together, but can also be easily cut into. The present disclosure is not limited to the mentioned fluorophores, a fluorophore of choice can be added as necessary.

The solid phantom is made up of agar powder, porcine whole blood, Tween® 20, Intralipid® 20%, and Phosphate Buffered Saline (PBS). For the PPIX agar phantom shown in FIG. 5 051, it contains PPIX and DMSO which are added to the substances above creating an agar phantom with a PPIX concentration of 5 μM. As mentioned previously, PPIX is present in gliomas when a patient ingests 5-ALA giving the tumor fluorescent properties and can be visualized with imaging systems. This is modeled by the PPIX phantom 051 and can be used to train users by providing a visualization of what surgical procedures will look like specifically with fluorescent agents. As an example, the fluorescent and physical properties are shown in FIG. 6. A surgical tool 060 is used to reveal the PPIX solid agar phantom 061 that is held within an ex vivo pig's brain which is used to simulate a surgical procedure like a glioma resection with appropriate visualization.

Figure 5:
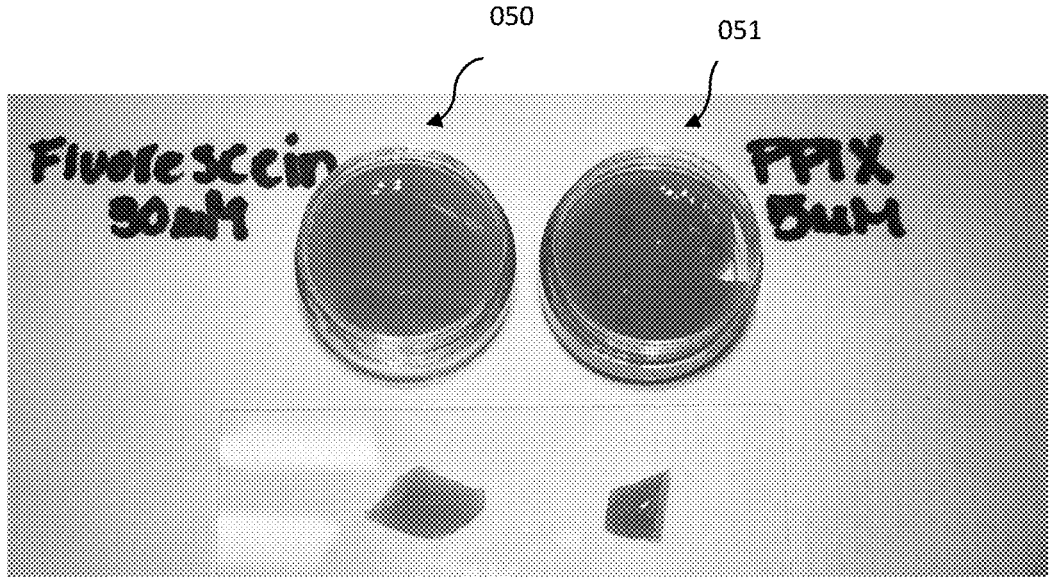
FIG. 5 is an example of the agar phantom for Sodium Fluorescein and PPIX at 30 μM and 5 μM concentrations respectively. They are held within circular containers for easy transportation and storage. In the bottom section of the image, one piece of each phantom has been placed on the slide. Sodium Fluorescein is on the left and PPIX is on the right.
Figure 6:
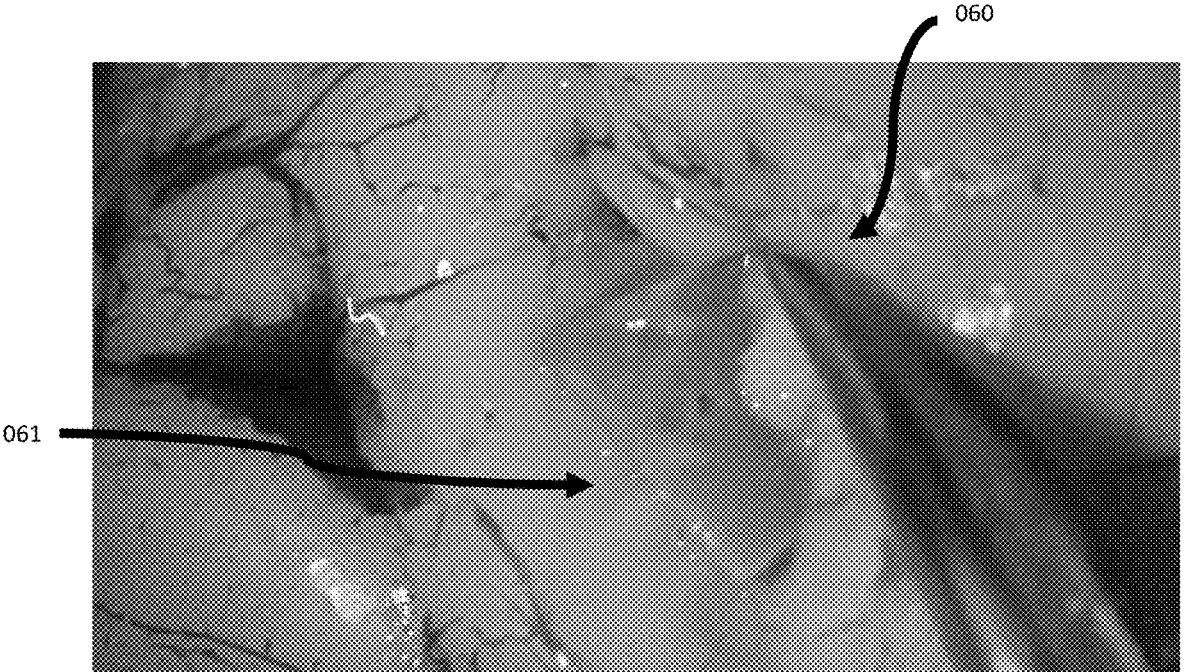
FIG. 6 is an example of the PPIX agar phantom within an ex vivo pig brain. A tool is used to pull back part of the brain to reveal the fluorescent agar phantom.
Figure 7:
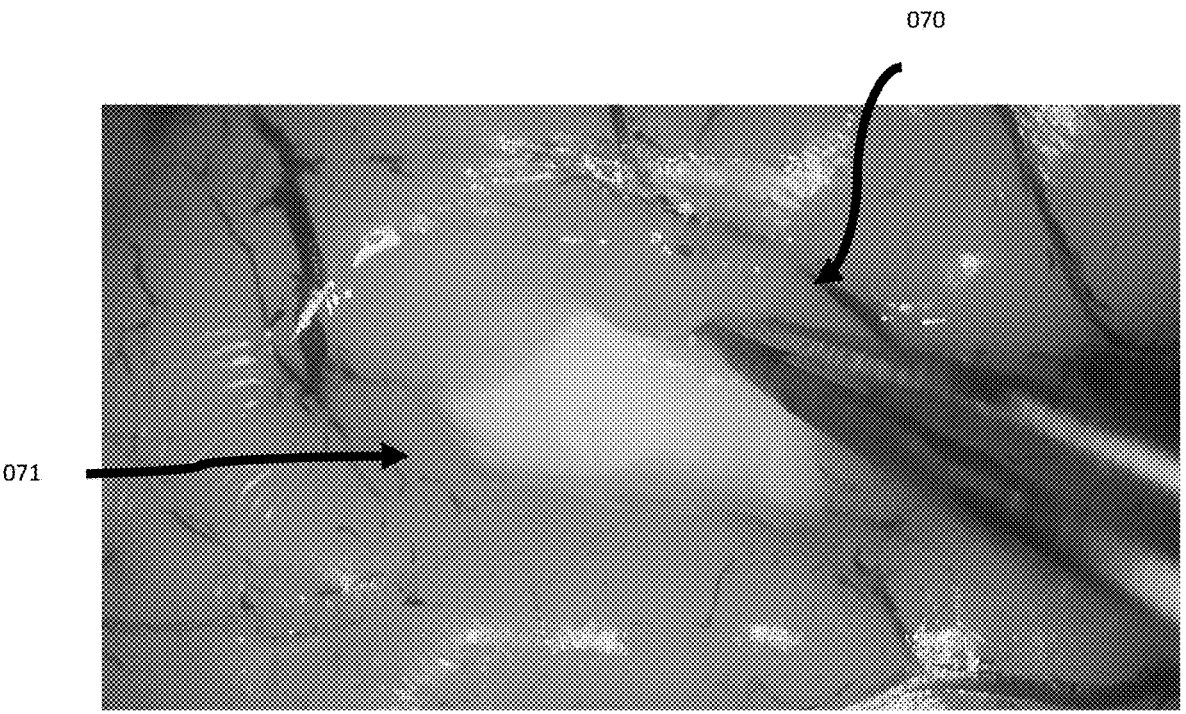
FIG. 7 is an example of the Sodium Fluorescein agar phantom within an ex vivo pig brain. A tool is used to pull back part of the brain to reveal the fluorescent agar phantom.
Figure 8:
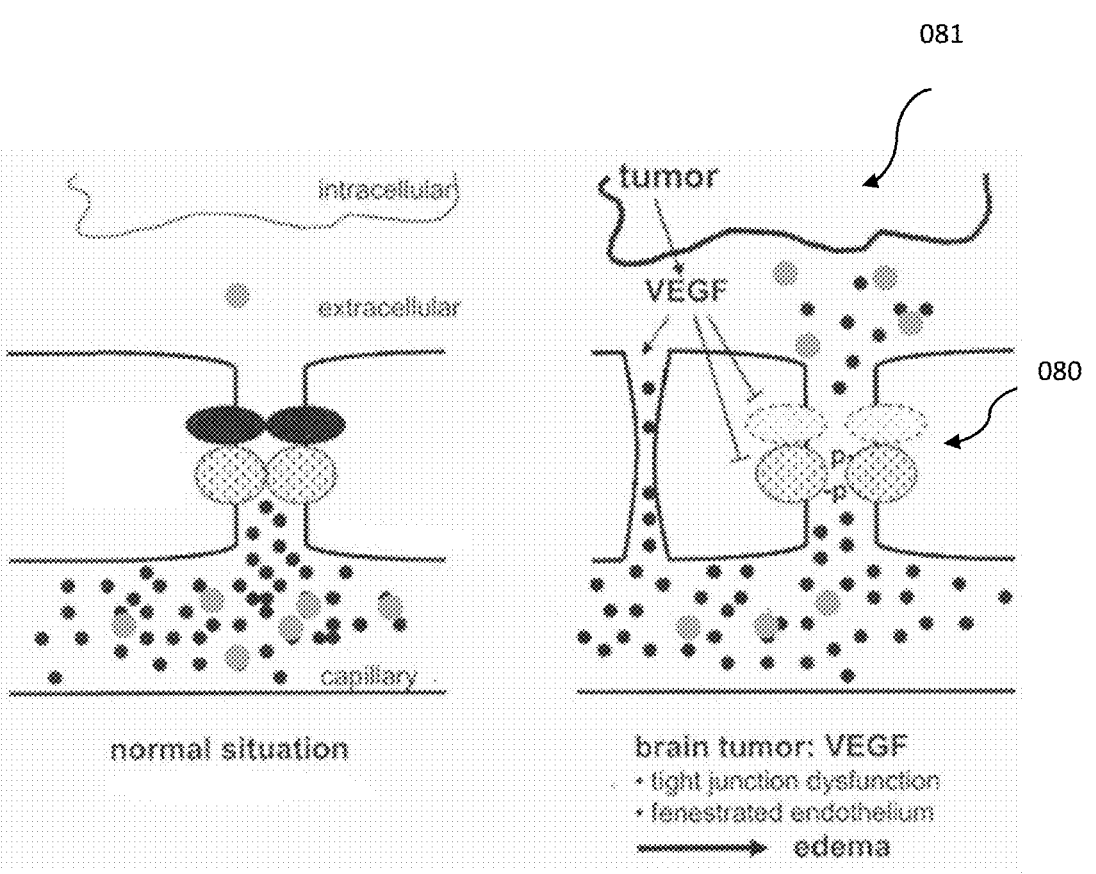
FIG. 8 illustrates the comparison between a typical blood brain barrier (BBB) versus the effects of a tumor on the BBB. For an average human, the BBB controls the movement of molecules in and out of the brain from the vasculature that surrounds it. When there is abnormal cell growth and a tumor forms within the brain (diagram on the right), the BBB no longer forms tight junctions and fenestrations occur that cause dysfunction of the BBB. The black dots are molecules within the blood and the green dots are specifically Sodium Fluorescein. When the BBB has fenestration, molecules including Sodium Fluorescein can pour into the area where the tumor resides from the surrounding vasculature. This is a fluorescence visual indicator that is commonly used for tumors.

Alternatively, the Sodium Fluorescein agar phantom shown in FIG. 5, 050 contains the same substances, excluding PPIX and DMSO, and includes Sodium Fluorescein and water. An example of the Sodium Fluorescein is shown in FIG. 7, where the agar phantom is within an ex vivo pig brain. A surgical tool 070 is used to reveal the Sodium Fluorescein phantom 071 to simulate a surgical procedure with appropriate visualization like the PPIX phantom. During neurosurgeries, the Sodium Fluorescein (as seen in FIG.

8), flows through the fenestrated blood brain barrier 080 that was caused by a cancerous growth 081 and pools into the surrounding area of the tumor. What is not shown within FIG. 7 is the visualization of Sodium Fluorescein as a fluid that surrounds the abnormal growth, rather, it is shown as an embodiment of the solid phantom. To simulate Sodium Fluorescein as a liquid, the dynamic phantom described in the following description could be used.

The dynamic liquid phantom uses the same materials, excluding agar powder, as the solid agar phantom. It resembles blood with fluorescent properties to simulate how fluorophores look in anatomy, specifically vasculature. The liquid phantom can be used in conjunction with a synthetic vessel to simulate blood flowing through the vasculature. The dynamic simulation allows users to see and be accustomed to the accurate use of fluorophores when injected into vessels.

Figure 9:
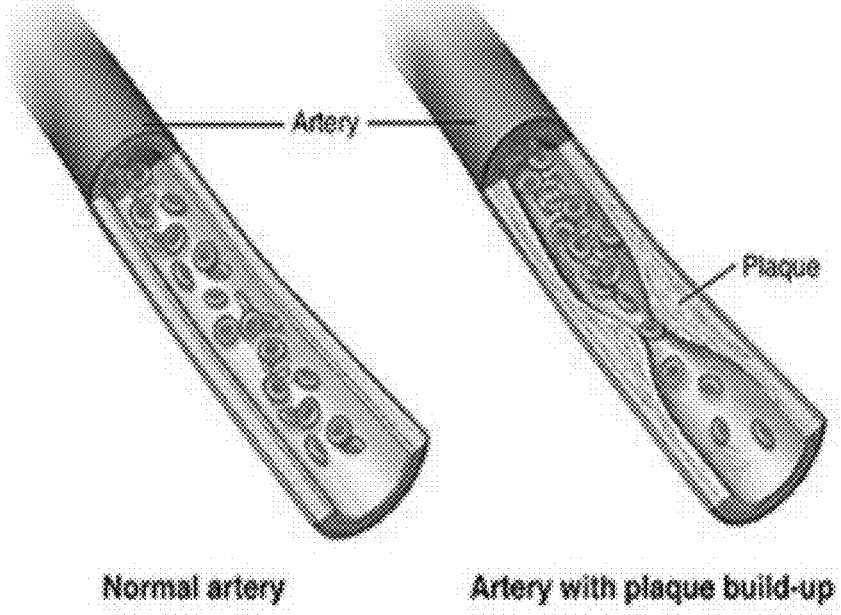
FIG. 9 is an illustration of an example of a normal artery compared to an artery with plaque buildup. The normal artery allows for regular flow of red blood cells, however the artery with plaque buildup restricts the flow of blood.

For example, the liquid phantom can simulate how fluorescent imaging will appear when looking at vasculature specifically with the ICG fluorophore. This aids surgeon's abilities to identity if there is an obstruction in, or lesion to, a blood vessel. Specifically in neurosurgery, blood clots or lesions within the brain can lead to high-risk symptoms for a patient. As seen in FIG. 9, one obstruction of an artery can be due to plaque build-up, which decreases the arterial blood flow rate and can lead to deficiencies in parts of the body that are supplied by that artery. It is important for surgeons to be able to easily identify where the abnormality is occurring and ICG is commonly used to highlight these areas. For surgical staff to test the use of the fluorophore and optical quality of a microscope, phantoms are used for training and allow surgeons the ability to practice surgeries where a lesion to a vessel would occur without practicing on a patient.

Figure 11:
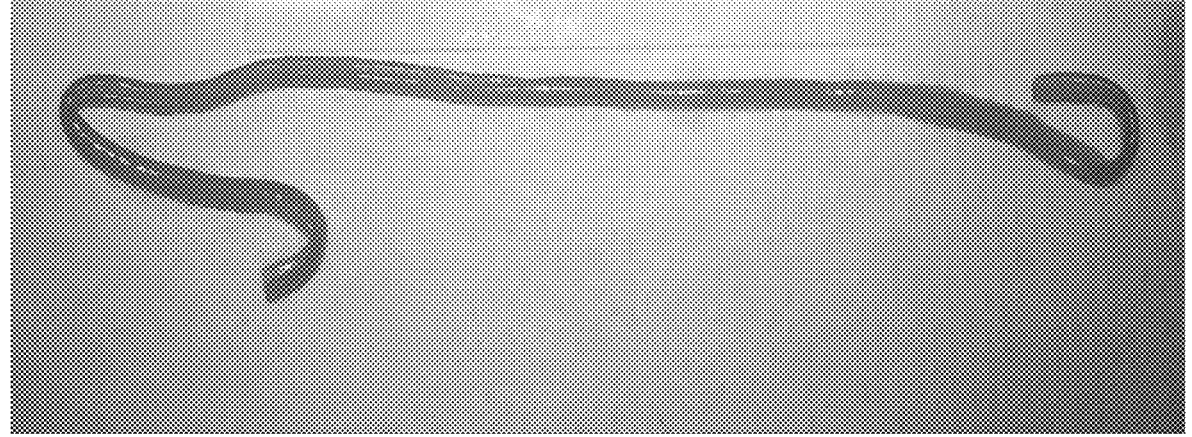
FIG. 11 is an example of a synthetic vessel.
Figure 12:
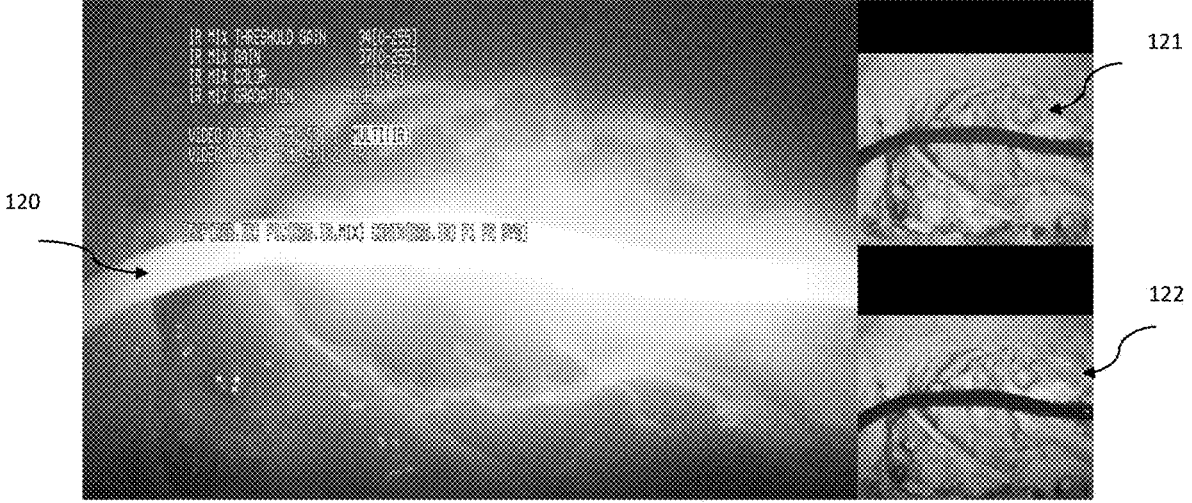
FIG. 12 is an example of the ICG fluorescent liquid phantom within the synthetic vessel. The vessel is laying on top of an ex vivo pig brain. The example includes the liquid phantom under; normal white light (bottom right), under excitation light (top right), and with excitation light and infrared camera settings to show a grayscale image of the fluorescent properties of ICG (left).

To create the liquid embodiment of the present disclosure, the procedure is represented in FIG. 10. The liquid phantom is not limited to ICG which is shown in the following figures, however ICG is the most common fluorophore that is used during medical procedures to visualize vasculature. The synthetic vessel in FIG. 11 allows the liquid phantom to be contained in an enclosure that closely mimics vessels within a body. The liquid phantom injected into the vessel phantom is shown in FIG. 12. Without excitation light, the phantom simulates blood within a vessel 122. When the excitation light for ICG is directed at the liquid phantom 121, the visualization of the blood goes from red to green as an indicator of the presence of ICG. With fluorescence imaging technology, imaging of the liquid phantom under infrared settings can create a grayscale image that clearly shows the fluorescent properties of the liquid phantom 120. This closely mimics the visual aids of ICG during a medical procedure and allows users to understand how the fluorophore looks and acts in a clinical application.

Figure 13:
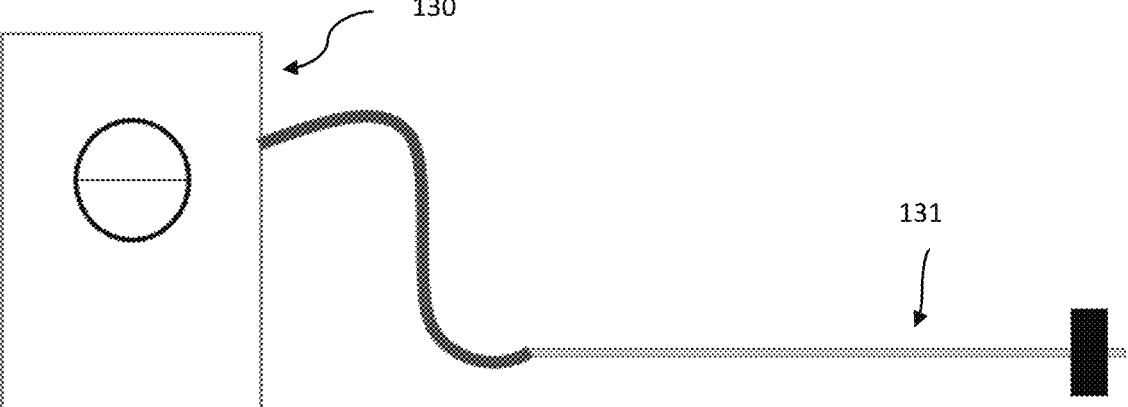
FIG. 13 is an illustration of a liquid phantom pump connected to a synthetic vessel, which illustrates a dynamic simulation that represents the ICG fluorophore as it flows through the vasculature of a body.

A further possible embodiment of the present disclosure is shown in FIG. 13. The liquid phantom can be considered dynamic as it can flow through a synthetic vessel. To enhance the simulation of how fluorophores are used in vasculature, FIG. 13 shows a liquid phantom pump 130 that pumps the liquid phantom into the synthetic vessel 131. This models how the fluorophores flow through vasculature and how that would be seen with the aid of imaging technology providing a close representation to users of what would be expected during surgery.

The imaging technology that is used for fluorescence-guided surgery must be calibrated and tested before use to mitigate any risks that could be caused by the technology. Therefore, it should be noted that the liquid phantom is not limited to containing only one specific fluorophore or being injected into another phantom. The phantom can be placed either within another phantom, a cadaver, or carcass, and have a light directed at it with the correct wavelength to excite the desired fluorophore within the phantom. For example, the liquid or solid phantom can be placed on a glass slide under the correct conditions and viewed under imaging technology. This can verify that the visualization meets specific standards and to ensure the fluorescence can be visualized at an optimal setting that allows users to use the technology at maximum efficiency. As described previously, the phantoms provide a close resemblance to the clinical application of the fluorophores and this is what allows it to be used as a testing and calibration tool.

The procedure for creating the liquid and solid phantom consists of a series of steps including but not limited to pre-calculations, using a hot plate, and combining many substances like, porcine whole blood, agar, a fluorophore of choice, Tween® 20, and Intralipid® 20%. When creating the solid agar phantom, calculations are performed prior to determine the amount of agar powder needed for the desired amount of phantom. Calculations are also performed to determine the concentration of the fluorophore and amount of stock solution needed for the phantom. Once the stock solution is prepared with water and the fluorophore of choice (if PPIX is used, DMSO is used instead of water within the stock solution), the hot plate is heated to approximately 340° C. The required amount of agar powder and phosphate buffered saline are combined in a beaker and placed on the hot plate until bubbling. Once the beaker is removed from the hot plate, all other substances including Tween® 20, Intralipid® 20%, blood, and the stock solution are measured and added to the agar mixture before cooled. The substances are mixed completely to form the phantom and poured into a mold of choice. The phantom is then placed in a fridge for at least 20 minutes before use. It should be noted that PPIX should be wrapped in black foil or placed in a dark area to avoid degradation of the fluorophore. For the liquid phantom the stock solution is created with the fluorophore of choice and is then combined with porcine whole blood (using correct measurements and amounts to achieve the desired concentration of fluorophore in the phantom). The phantom is then poured into a sealed container and stored until needed for use.

In further embodiments, the solid phantoms can be molded to different shapes, not limited to the tumor mentioned. The phantom could mimic other tissue and bone to resemble the surgical scenario most accurately. As well, the solid phantoms are not limited in size, they can be created and molded to the desired substance that the phantom is mimicking. For a more accurate representation of the desired anatomical feature from the phantom, the phantom can be placed into other phantoms or into biological tissue from a carcass or cadaver. This betters the phantoms representation of a procedure.

For the present disclosure, the phantom is not limited to fluorophores that fluoresce at the wavelengths of interest or agar powder specifically. Further embodiments can be created using other fluid-based gels that fluoresce at other wavelengths such as polyacrylamide, gelatin, hydrogels, polydimethylsiloxane, or polyvinyl alcohol. The materials used in the present disclosure include blood, Intralipid®, and PBS, however, in further embodiments of the phantom, it could be created using other materials that mimic the absorption and scattering properties of tissue like colored dyes, plasmonic nanoparticles, or scattering agents including polystyrene microspheres and silica/graphite particles.

In further embodiment, the phantom can be created with multiple fluorophores in them. For example, a phantom can have a combination of PPIX, Sodium Fluorescein, and ICG.

According to further embodiments, a method of creating an agar phantom is disclosed. The method comprises the steps of mixing a gel material with water, heating the gel material on a hot plate, adding substances that mimic tissue scattering and absorption properties, pouring into desired mold before mixture begins to set, initiating a gelation reaction, removing the phantom from the mold once the gelation reaction is complete and/or the phantom has set. The gel material comprises providing the gel material being made of the preferred measurements of mixing 1/2 cup of water with 1/2 tsp of agar power. The method further comprising the step of molding the phantom in a desired shape by placement in a solid mold.

According to the disclosure, the step of providing the agar phantom further comprises preparing the stock solution for fluorophore of interest that will most closely resemble the surgical scenario, heating a hot plate to ~340° C., measuring out the necessary amount of agar powder using electronic scale for amount of phantom needed and then place into a 100 ml beaker, measuring out necessary amount of PBS and add into the 100 ml beaker, stirring the PBS-agar mixture until completely mixed, placing the beaker on hot plate and stir periodically once the hot plate is to temperature, bringing the agar solution to a boil, turning off the hot plate and let the agar simmer for 5 minutes when the agar solution is at a boil, setting the 100 ml beaker aside and let it cool for ~1 minute, pipetting the required volume of each substance (Tween® 20, Intralipid®, blood, and the stock solution made in step 1) into the 100 mL beaker of agar gel material once cooled but not solidified, disposing the pipette tips into bio-hazard waste box after use, stirring the agar until completely mixed, pouring into a desired container before agar begins to set and cooling the mixture in for ~20 minutes before use. The step of providing the stock solution comprises providing the stock solution be made of water and ICG or Sodium Fluorescein, or DMSO and PPIX. Further, the agar phantom is preferred to be stored in a dark area to prevent degradation of the fluorophore, specifically regarding if the fluorophore is PPIX. The agar phantom comprises of a configuration bounded by the mold it is placed into, wherein the mold is any desired shape or size.

According to further embodiments, a method of creating a liquid phantom is disclosed. The method comprises the steps of creating a stock solution for a fluorophore of interest, combining a stock solution with substances that mimic a tissue's scattering and absorption properties and storing the phantom. The step of molding the phantom in a desired shape by placement in a solid mold. The step of providing a liquid phantom further comprises setting a target concentration for fluorophore stock solution based on a desired concentration, weighing out in plastic dish the amount of fluorophore needed, mixing the ICG with water to create stock solution (using a 12 mL syringe), calculating volume of stock solution and sheep blood needed to create the desired ICG dilution concentration (using the dilution equation: $M_1V_1 = M 2V_2$), combining the ICG stock solution with the necessary amount of sheep blood to create the ICG dilution (using a 1000 μL micropipette and 12 ml syringe) and placing the phantom into container for storage. The aforementioned method further comprises storing phantom the refrigerator until needed for use.

As used herein, the term "plurality" denotes two or more. For example, a plurality of components indicates two or more components. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on." While the foregoing written description of the system enables one of ordinary skill to make and use what is considered presently to be the best mode thereof, those of ordinary skill will understand and appreciate the existence of variations, combinations, and equivalents of the specific embodiment, method, and examples herein. The system should therefore not be limited by the above-described embodiment, method, and examples, but by all embodiments and methods within the scope and spirit of the system. Thus, the present disclosure is not intended to be limited to the implementations shown herein but is to be accorded the widest scope consistent with the principles and novel features disclosed herein.

The invention claimed is:

1. A method for forming a solid phantom for training users of fluorescence imaging, the method comprising the steps of:

mixing agar powder with phosphate-buffered saline (PBS) to form a gel material;

heating the gel material to a temperature sufficient to form an agar solution;

allowing the heated agar solution to cool but not solidify;

adding a fluorophore stock solution comprising one or more of protoporphyrin IX (PPIX), indocyanine green (ICG), or sodium fluorescein at a concentration effective to simulate a surgical procedure in a clinical setting;

adding one or more optical scattering agents selected from porcine blood, an intravenous fat emulsion, or a polysorbate;

pouring the mixture from the mixing and adding steps into a mold representative of an anatomical feature; and refrigerating the mold for a time sufficient to allow solidifying and phantom formation;

wherein the solid phantom emits fluorescence when excited at a wavelength of interest.

2. The method of claim 1, wherein the mold comprises a feature selected from a brain tissue, a blood vessel, or a tumor shape.

3. The method of claim 1, wherein the gel material is made by mixing 1/2 cup of PBS with 1/2 tsp of agar power.

4. The method of claim 1, wherein the solid phantom is made by the following steps:

preparing the fluorophore stock solution;

heating a hot plate to ~340° C.;

measuring out necessary amount of the agar powder using electronic scale and then placing into a 100 ml beaker;

measuring out necessary amount of PBS and adding into the 100 ml beaker;

stirring the PBS-agar mixture until completely mixed;

placing the beaker on hot plate and stirring periodically once the hot plate is at a desired temperature;

bringing the agar solution to a boil;

turning off the hot plate and letting the agar solution simmer for 5 minutes;

setting the 100 mL beaker aside and cooling for ~1 minute;

pipetting required amounts of the fluorophore stock solution and the one or more optical scattering agents into the 100 ml beaker containing the agar solution once cooled but not solidified;

disposing pipette tips into bio-hazard waste box after use;

stirring the mixture in the pipetting step until completely mixed;

pouring into a desired container before the mixture begins to solidify;

cooling the mixture in for ~20 minutes before use.

5. The method of claim 4, wherein the fluorophore stock solution is made of water and ICG or Sodium Fluorescein, or DMSO and PPIX.

6. The method of claim 4, wherein the solid phantom is stored in a dark area to prevent degradation of the PPIX.

7. The method of claim 6, wherein the solid phantom has a configuration bounded by the mold of any desired shape or size.

8. The method of claim 1, wherein the fluorophore concentration is:

5 μM for PPIX;

6.5 μM for ICG; and

30 μM for sodium fluorescein.

9. The method of claim 1, wherein the mixture is stirred until completely mixed.

10. The method of claim 1, wherein the solid phantom is wrapped in black foil to avoid degradation of the PPIX.

11. The method of claim 1, wherein the solid phantom is stored in a dark area to avoid degradation of the fluorophore.

12. The method of claim 1, wherein the solid phantom is used for calibrating or testing imaging systems used in medical procedures.

13. The method of claim 1, wherein the intravenous fat emulsion comprises a 20% intravenous fat emulsion and the polysorbate comprises polysorbate 20.

* * * * *